June 25, 1968  E. M. TRAMMELL, JR  3,389,486
VEHICLE LICENSE PLATE HOLDERS
Filed Dec. 31, 1964  2 Sheets-Sheet 1

INVENTOR
EARL M. TRAMMELL JR.
BY
Cohn and Powell
ATTORNEYS

June 25, 1968 E. M. TRAMMELL, JR 3,389,486

VEHICLE LICENSE PLATE HOLDERS

Filed Dec. 31, 1964 2 Sheets-Sheet 2

INVENTOR
EARL M. TRAMMELL JR.

BY Cohn and Powell

ATTORNEYS

United States Patent Office 3,389,486
Patented June 25, 1968

3,389,486
VEHICLE LICENSE PLATE HOLDERS
Earl M. Trammell, Jr., 39 Salem Estates Drive,
Ladue, Mo. 64758
Filed Dec. 31, 1964, Ser. No. 422,648
13 Claims. (Cl. 40—209)

ABSTRACT OF THE DISCLOSURE

A license plate holder including a frame having inturned flanges at opposite sides. A fastening means, such as a hook or snap fastener is located in a compatible recess formed in each inturned flange, the fastening means being adapted to fix the frame to a supporting member. The frame is of substantially an E-shaped cross section which is open at one side and which has a pair of separate channels. One channel receives the license plate through the open side, while the other separate channel receives the supporting member through the open side without disturbing the license plate. A screw punctures the license plate and fixes the plate to the frame. The fastening means can be slidably mounted to a bar that is fixed to opposite sides of the frame, the fastening means being adjustable to different positions to interfit coacting openings provided in the supporting member.

---

This invention relates generally to improvements in automobile or vehicle license plate holders, and more particularly to improved devices of this type which provide a quick and efficient installation and removal of license plates.

It is an important objective to achieve a license plate holder that can be conveniently and advantageously utilized by automobile dealers to install all licenses readily without the use of tools, without any handling of loose screws, nuts and the like, and without the need for a skilled mechanic. The automobile dealer saves on installation time and on labor cost.

An important object is realized in that the improved license plate holders provide a snap-on and snap-off feature to enable fast attaching and detaching of dealer plates. For the first time, the dealer can justify the use of a holder with dealer plates. Heretofore, the use of frames and holders only added to the time and to the complicated steps of installing and removing such dealer plates, thereby making such use too expensive.

Many states now issue license plates for use over a period of several years, and it is in the interest of the automobile owner to protect his plates from normal weathering and from damage by enclosing and shielding them in a suitable license plate holder. The license plate holders, presently disclosed, enable automobile users to remove and replace their plates easily without the need for tools and without any harmful defacement of the plates.

Another important object is attained by the structural arrangement of the component parts comprising the license plate holder which causes an automatic piercing of the license plate by a securing screw in attaching the plate to the holder, without any visual or harmful defacement of the plate. Under some circumstances, the means for attaching the holder to a supporting member, such as a bumper or a hinge plate adapted to cover the gas cap, is fixed to the holder by the same puncture screw.

Still another important objective is afforded by the provision of a combination of hook and snap fasteners that greatly facilitates installation and removal of the license plate holders.

An important object is provided by the provision of means on the license plate holder which enables the supporting member, such as a hinge plate, to be slid into and retained by the holder for a fast and convenient connection.

Another important object is achieved by the provision of means on the license plate holder to which the attachment parts, such as snap fasteners, are slidably mounted for relative adjustment in order to accommodate and align with suitable openings formed in the supporting member, whereby such parts can be simply inserted and automatically latched in place to effect securement of the holder to the supporting member.

Yet another important object is realized by the provision of a snap nut that is expandable automatically upon insertion into a compatible opening formed in the supporting member so as to be locked in place, the nut having an off-center threaded hole into which a screw is fitted incident to attachment of the holder to the supporting member, the off-center hole being adjusted to different positions upon turning the nut in its opening in order to provide an adjustment in the installation fit.

An important object is attained by accomplishing an attachment of the holder by connections directly with the holder frame to the supporting member of the automobile, and not by any connections through the conventional holes provided in the license plate. The automobile manufacturers will design or coordinate their supporting members, such as bumpers, to accommodate this new type of license plate frame.

It is an important object to provide a license plate holder that is simple and durable in construction, economical to manufacture and assemble, efficient in operation, and which can be utilized by anyone with little or no instruction.

The foregoing and numerous other objects and advantages of the invention will more clearly appear from the following detailed description of several embodiments, particularly when considered in connection with the accompanying drawings, in which.

Figure 1:
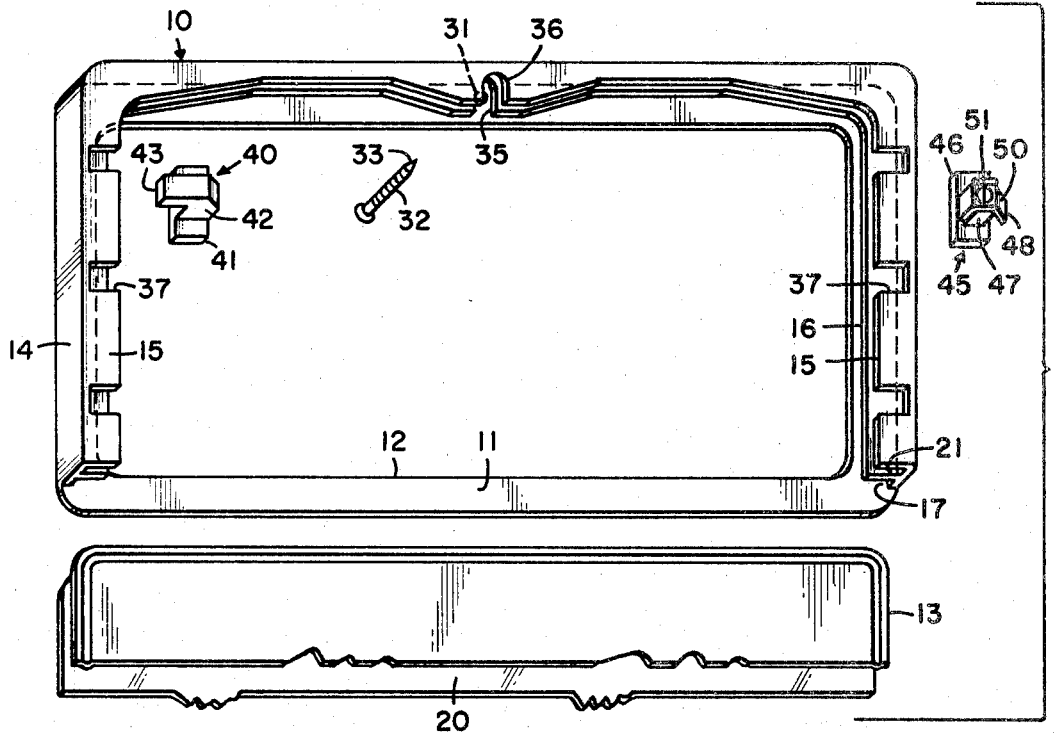
FIG. 1 is a perspective view of a licence plate holder and various attachment means, and a fragmentary perspective view of the plastic window and license plate.

The license plate holder includes a substantially rectangular frame generally indicated at 10 having a generally E-shaped cross section at three sides. The frame 10 includes a substantially continuous, rectangular front flange 11 defining an opening 12 through which the license plate 13 is visible. In addition, the frame 10 includes rearwardly extending side flanges 14 on three of the four sides of such frame, the fourth side being open. Inturned rear flanges 15 extend integrally from the side flanges 14, the rear flanges 15 being located behind the front flange 11. An intervening flange 16 extends integrally from each of the side flanges 14, the intervening flange 16 being located between and spaced from the front flange 11 and the rear flange 15.

It will be understood that this E-shaped frame construction provides a front channel 17 that is open at the bottom and is adapted to receive and retain the plastic window 20 and the license plate 13. As will be apparent upon later description of parts, this E-shaped frame provides a rear channel 21 that is open at the bottom to receive a supporting member 26, such as the hinge plate in FIG. 2.

Figure 3:
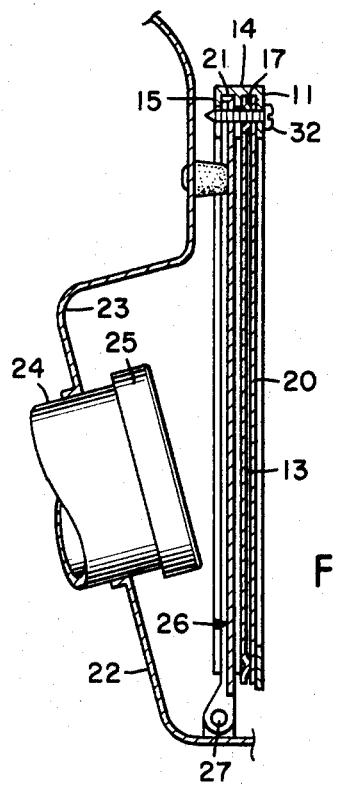
FIG. 3 is a cross sectional view of the license plate holder attached to the hinge plate.

The automobile body 22 (FIG. 3) has a depression 23 into which a pipe 24 extends, the pipe 24 leading to the gas tank (not shown). The pipe 24 is closed by the usual gas cap 25. As is presently conventional in many models of automobiles, the gas cap 25 is covered by a hinge plate constituting a supporting member 26, the hinge plate 26 being pivotally connected by connection 27 to the body 22 for swinging movement downwardly for access to the gas cap 25. For reasons which will later appear, the supporting member 26 is provided with a narrow slot 30 near its top margin. The supporting member 26 is of a size and thickness to slip into the rear channel 21 of frame 10 through its open bottom, whereby to connect the frame 10 to the supporting member 26.

Formed in the upper portion of front flange 11 is a tapped hole 31 adapted to receive a puncture screw 32 having a tapered end 33. The screw 32 is of a type that can be driven most conveniently by a hex-wrench generally referred to at 34 in FIG. 2. The intervening flange 16 and the rear flange 15 immediately behind the tapped hole 31 are provided with substantially U-shaped recesses 35 and 36 respectively through which the screw 32 can freely extend upon insertion and threaded connection.

When the plastic window 20 and the license plate 13 are inserted into the front channel 17 through the open bottom of frame 10, the window 20 and license plate 13 are secured to the frame 10 by connection of the screw 32. Upon tightening the screw 32, the screw 32 will puncture the margin of the window 20 and the license plate 13 to fix the window 20 and plate 13 to the frame 10. Upon continued tightening of the puncture screw 32, such screw 32 will extend freely through the flange recesses 35 and 36. Because only the edges of the window 20 and plate 13 are punctured, these elements are not visually defaced. Only a small hole is formed in the plate edge so the plate 13 is not harmed in any way.

To install the license plate holder described above, the plastic window 20 and the license plate 13 are first inserted into the front channel 17 so as to be visible through the frame window 12 and to be retained within the frame 10. Then, the frame 10 is located over the supporting member 26, such as the hinge plate of FIG. 2, so that the supporting member 26 is aligned with the open bottom of the rear channel 21. The frame 10 is moved downwardly so as to insert the supporting member 26 into the rear channel 21, the peripheral margin of the supporting member being confined by the side flanges 14 and by the spaced frame flanges 15 and 16 forming the rear channel 21. The frame 10 is of a size so as not to interfere with the hinged movement of the supporting member 26 as it is swung to a closed position over the gas cap 25 or as it is swung downwardly to expose the gap cap.

When the supporting member 26 is fully inserted, the hinge plate slot 30 is aligned with the tapped hole 31 and the flange recesses 35 and 36.

The puncture screw 32 is threadedly connected to the frame 10 by insertion into the tapped hole 31. Upon manipulation of the hex-wrench 34, the screw 32 is threadedly moved inwardly so that the screw 32 punctures the upper edge of the plastic window 20 and the license plate 13 to secure these elements to the frame 10. Upon continued turning of the puncture screw 32 by wrench 34, the screw 32 moves into and through the elongate slot 30 formed in the supporting member 26 and passes freely through the flange recesses 35 and 36. Because the puncture screw 32 moves through the elongate slot 30, it is seen that the screw 32 fastens the frame 10 to the supporting member 26 by precluding withdrawal of the supporting member 26 from its receiving channel 21.

To remove the license plate holder, the wrench 34 is applied to the screw 32 to withdraw the screw from frame 10. When the screw 32 is removed, the frame 10 is released from the supporting member 26, thereby permitting the frame 10 to be raised to withdraw the supporting member 26 from the rear channel 21 through the open bottom of the frame 10. In addition, the plastic window 20 and the license plate 13 are released from the frame 10, thereby enabling the window 20 and plate 13 to be removed from their receiving channel 17 by withdrawal through the open bottom of such frame 10.

Another means for attaching the frame 10 to a supporting member 26 can be utilized. From FIG. 1, it is seen that the inturned flanges 15 at opposite sides of the frame 10 are provided with a plurality of spaced recesses 37. These recesses 37 communicate directly with the rear channel 21 and extend substantially to the associated side flanges 14.

At one side of the frame 10, the flange recesses 37 are adapted to cooperate with a hook generally indicated at 40. This hook 40 includes a base portion 41 having a width and thickness approximating that of the rear channel 21 so that the base portion 41 can be slidably inserted into the rear channel 21. Furthermore, the hook 40 includes a post portion 42 of a cross sectional dimension to interfit the recesses 37, and includes an integral hook portion 43 extending rearwardly from the inturned flange 15 and extending outwardly beyond the associated side flange 14.

The hook portion 43 of hook 40, when the hook 40 is located in the rear channel 21 and in one of the recesses 37, is adapted to be received in a compatible opening 44 (FIG. 4) formed in the supporting member 26 as defined by a bumper. When inserted into the opening 44, the hook portion 43 engages behind the margin of opening 44 to secure that side of frame 10 to the supporting member 26.

Figure 2:
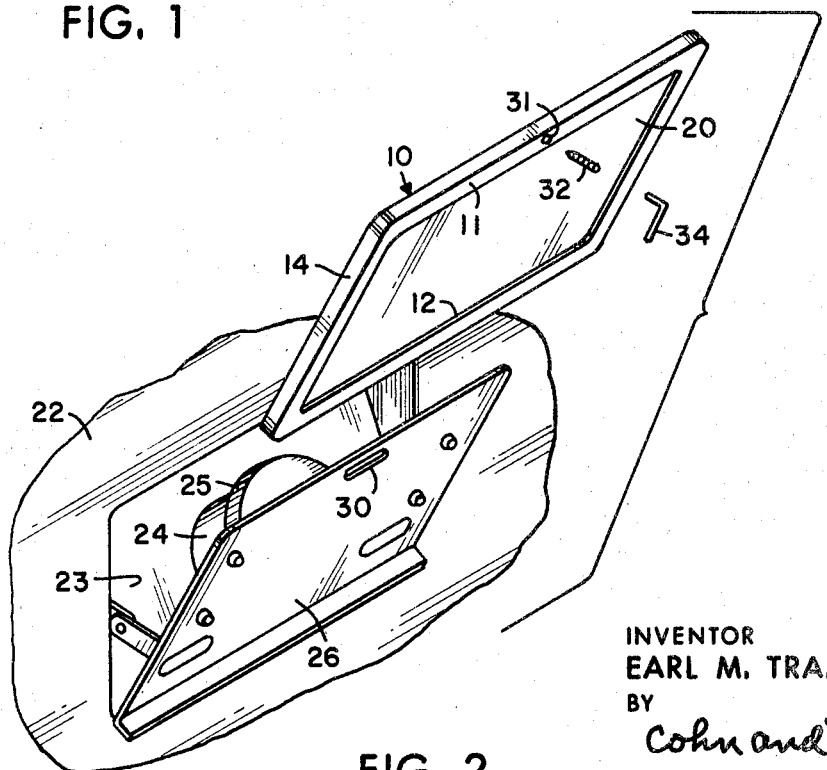
FIG. 2 is a perspective view of a supporting member, such as a hinge plate, and of the license plate holder utilized with such supporting member.
Figure 4:
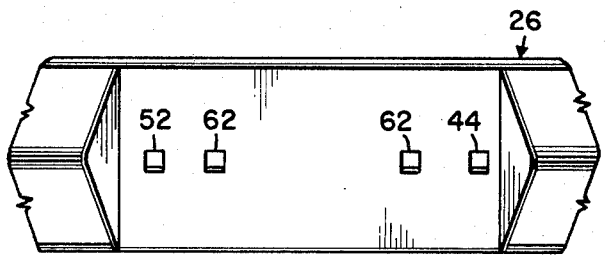
FIG. 4 is a fragmentary front elevational view of a supporting member, such as a bumper.

Of course, it will be understood that the supporting member 26 in FIG. 4 is a bumper, but the openings provided in such bumper could just as well be formed in the hinge plate of FIG. 2 or in any other element constituting a supporting member on the automobile.

A snap fastener generally indicated at 45 (FIG. 1) is associated with one of the recesses 37 at the opposite side of frame 10. This snap fastener 45 includes a base portion 46 having a width and thickness substantially conforming to the width and depth of the rear channel 21 so that the base portion 46 can be slidably received in such channel 21. In addition, the snap fastener 45 includes a post 47 on which a substantially U-shaped spring 50 is attached by a screw 51. The post 47 is of a cross sectional dimension so as to interfit the recesses 37. The U-shaped spring 50 extends beyond and is spaced from the rear side of the associated inturned flange 15.

To attach the snap fastener 45 to the frame 10, the post 47 is aligned with one of the recesses 37 and moved into such recess with the base portion 46 slidably moving into the rear channel 21. Thus it is seen that in one embodiment of the attachment means, a hook 40 is retained by the frame 10 at one side while a snap fastener 45 is retained by the frame 10 at the opposite side.

To install this license plate holder, the plastic window 20 and the license plate 13 are inserted into the front channel 17 through the open bottom. The window 20 and plate 13 are retained in place by threaded attachment of the puncture screw 32 into the tapped hole 31, the screw 32 puncturing the window 20 and license plate 13 and passing freely through the flange recesses 35 and 36. After the window 20 and plate 13 have been secured in place within the confines of frame 10, and specifically within the front channel 17 by the application of screw 32, the frame 10 is then attached to the supporting member.

First, the hook 40 is inserted through its cooperating opening 44 in the supporting member 26 to engage the hook portion 43 behind the margin defining such opening 44. Then, the opposite side of the frame 10 is swung against the supporting member 26 to bring the snap fastener 45 into alignment with its cooperating opening 52 formed in the supporting member 26. Upon insertion of the snap fastener 45 into the opening 52, the arms of the U-shaped spring 50 will flex inwardly toward each other, and then, upon complete insertion, will snap outwardly so that the hook shoulders 48 engage the back side of the supporting member 26 to lock the snap fastener 45 in place. The license plate holder is then securely fastened to the supporting member 26.

In order to disassemble the license plate holder from the supporting member 26, the spring 50 must be disassembled by removal of the screw 51. When the spring 50 is removed, the snap fastener 45 can be easily withdrawn from its opening 52, releasing that side of the frame 10 and enabling the frame 10 to be swung outwardly so as to effect release of the hook 40 from its cooperating opening 44. The plastic window 20 and the license plate 13 can be simply released by the removal of the puncture screw 32. Upon release, the window 20 and plate 13 can be withdrawn from the front channel 17 through the open bottom of frame 10.

Instead of utilizing a hook 40 at one side of the frame 10 and snap fastener 45 at the opposite end, another snap fastener 45 may be utilized in lieu of the hook 40. Under these circumstances, the pair of snap fasteners 45 are inserted into appropriate recesses 37 at opposite sides of the frame 10 in the manner previously described. Assuming that the window 20 and the license plate 13 are inserted into the front channel 17 and retained in place by insertion of the puncture screw 32, the frame 10 is then attached to the supporting member 26 (FIG. 4) by aligning the snap fasteners 45 with the appropriate openings 44 and 52. Then, the snap fasteners 45 are inserted into the openings 44 and 52. When fully inserted, the U-shaped springs 50 will automatically expand and snap the hook shoulders 48 behind the edges defining the openings 44 and 52 so as to fix the frame 10 to the supporting member 26.

To disassemble the frame 10, the springs 50 of the pair of snap fasteners 45 must be removed from their associated snap fasteners by removal of the screws 51 holding the springs 50 to the snap fastener posts 47. When the springs 50 are disassembled, the snap fasteners 45 can be easily withdrawn from the openings 44 and 52. The snap fasteners 45 can then be readily conditioned for subsequent use by reassembly of the springs 50 to the snap fastener posts 47 by application of the screws 51.

Figure 5:
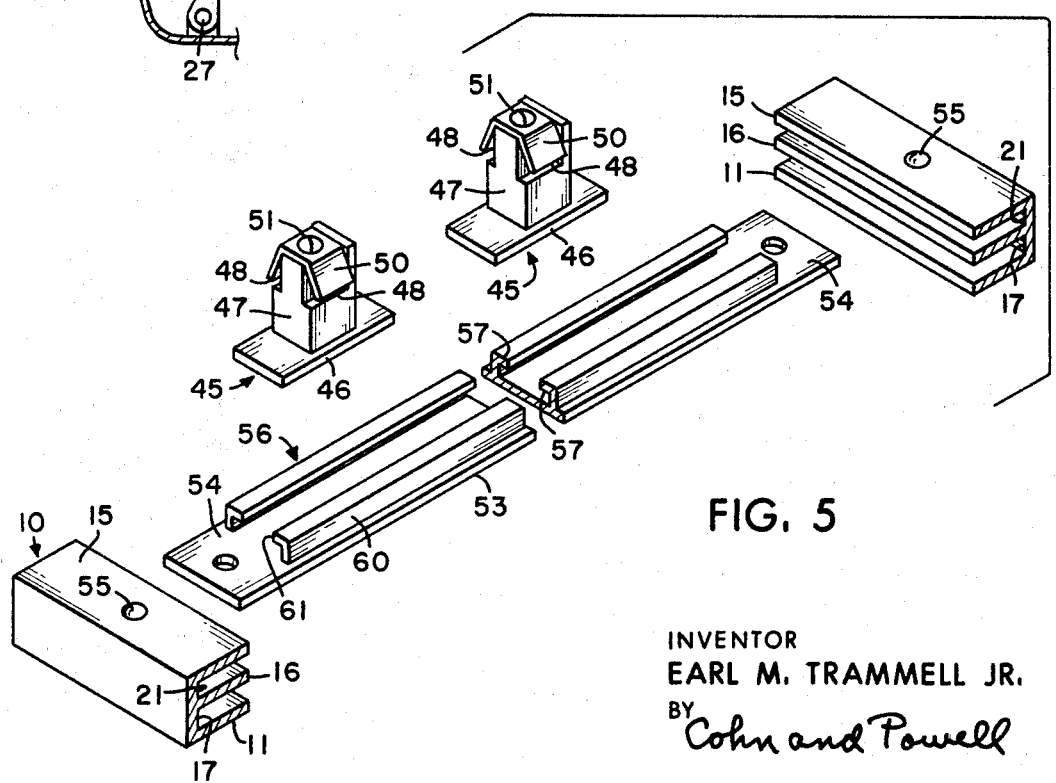
FIG. 5 is an exploded, perspective view of a modified attachment means utilized with the holder frame.

Another embodiment of the attachment means for license plate holder is illustrated in FIG. 5. In this modification, the frame 10 has the same construction as previously described with respect to the embodiments of FIGS. 1–4 inclusive. For example, the frame 10 is of substantially E-shaped cross section consisting of a front flange 11, rearwardly extending side flanges 14, inturned rear flanges 15 and intervening flange 16. This frame construction defines the front channel 17 and the rear channel 21, the front channel 17 being adapted to receive and retain the plastic window 20 and the license plate 13 in the manner previously described. However, the means for attaching the frame 10 to the supporting member 26 is slightly different in construction.

Extending across the opposite sides of frame 10 is a slide bar 53 having opposite ends 54 that are slidably inserted into the rear channel 21 through the open bottom of frame 10. When the slide bar 53 is slidably moved to and located in the desired position along the side of the frame 10 within the rear channel 21, the slide bar 53 is fixed by any suitable means, such as a screw (not shown), fastening the inturned rear flanges 15 to the bar ends 54 or by dimpling the inturned rear flanges 15 to wedge the bar ends 54 in place within the rear channel 21 as is indicated by the dimples 55 in FIG. 5.

The slide bar 53 is preferably formed of an extruded piece and includes an integral slide track 56 on the rear side of such bar 53, the track 56 consisting of relatively inturned, laterally spaced, inverted L-shaped lips 57.

Slidably located within and retained by the track 56 are a pair of snap fasteners 45, each snap fastener 45 including a post 47 on which a U-shaped spring 50 is attached by a screw 51. The base portion 46 of each snap fastener 45 is of a width to be received between the relatively vertical portions 60 of track lips 57 and yet retained by the overlying horizontal lip portions 61. The post 47 is of a dimension to extend through the space provided between the horizontal lip portions 61.

The snap fasteners 45 are assembled to the bar track 56 before the bar 53 is assembled and fixed to the holder frame 10. The snap fasteners 45 are slipped into the track 56 from either end of the bar 53 and are accordingly held within such track 56. Then, the bar 53 is assembled to the frame 10 in the manner described previously.

The frame 10 is secured to the supporting member 26 (FIG. 4) by moving the snap fasteners 45 slidably along the track 56 until the snap fasteners 45 are aligned with suitable openings 62 formed in the supporting member 26. Then, the snap fasteners 45 are pushed into and through such openings 62, the U-shaped springs 50 flexing resiliently upon insertion and automatically expanding to snap behind the margins defining the openings 62 to hold the frame 10 in place, and thereby fix the frame 10 to the supporting member 26.

To disassemble the frame 10 from the supporting member 26, the U-shaped springs 50 of the snap fasteners 45 must be removed from their associated posts 47 by unthreading the screws 51. When the springs 50 are disassembled, the snap fasteners 45, can be easily withdrawn from their cooperating openings 62. Again, the snap fasteners 45 can be readily reconditioned for subsequent use by assembling the springs 50 on the posts 47 with screws 51.

It will be understood that while the above explanation describes the attachment of the snap fasteners 45 to appropriate openings 62 in a bumper constituting a supporting member 26 in FIG. 4, that such openings 62 can be supplied in the hinge plate of the type disclosed in FIG. 2 or in any other element on the vehicle to which the license plate holder is to be attached as long as such element constitutes a supporting member.

In lieu of one of the snap fasteners 45 in FIG. 5, a suitable hook of the type disclosed at 40 in FIG. 1 may be used. In this instance, the base portion 41 of the hook 40 is slidably inserted and received in the track 56 just the same as is the base portion 46 of the snap fastener 45. To assemble such a frame 10 to the supporting member 26, the hook 40 and cooperating snap fastener 45 are slidably adjusted within and along the track 56 until they are aligned with their coacting openings 62. Then, the hook portion 43 of the hook 40 is inserted through its compatible opening 62 until such hook portion 43 moves behind the opening edge to hook in place. Then, the snap fastener 45 is moved into and through its compatible opening 62, the U-shaped spring 50 of such snap fastener 45 expanding upon complete insertion to snap the hook shoulders 48 behind the edge of the compatible opening 62 to lock the snap fastener in place. The hook 40 and the snap fastener 45 cooperate to secure the frame 10 to the supporting member.

To disassemble such a unit, the spring 50 of the snap fastener 45 must be removed from its associated post 47 by unthreading its attaching screw 51. Then, the snap fastener 45 can be easily withdrawn from its compatible opening 62, and allow the frame 10 to be swung outwardly to effect release of the hook 40 from its compatible opening 62.

Although the invention has been described by making detailed reference to several embodiments of the attachment means for a license plate holder, such detail is to be understood in an instructive, rather than in any restrictive sense, many variants being possible within the scope of the claims hereunto appended.

I claim as my invention:
1. In a license plate holder;
   (a) a frame including a front flange and rearwardly extending flanges, one side of the frame being open for insertion of the plate,
   (b) the frame having inturned flanges at least on one pair of opposite sides of the frame, each inturned flange being provided with a recess, and
   (c) separable fastening means inserted in each recess and retained by the associated inturned flange, each fastening means projecting rearwardly through its associated recess, the fastening means being adapted to secure the frame to a supporting member.
2. In a license plate holder:
   (a) a frame including a front flange and rearwardly extending flanges, one side of the frame being open for insertion of the plate,
   (b) the frame having inturned flanges at least on one pair of opposite sides of the frame, each inturned flange being provided with a recess,
   (c) a hook inserted in the recess of one flange and retained by said flange, and
   (d) a snap fastener inserted in the recess of the other flange and retained by the last said flange, the hook and snap fastener being adapted to fix the frame to a supporting member.
3. In a license plate holder:
   (a) a frame including a front flange and rearwardly extending flanges, one side of the frame being open for insertion of the plate,
   (b) the frame having inturned flanges at least on one pair of opposite sides of the frame, each inturned flange being provided with a recess, and
   (c) a snap fastener inserted into each recess and retained by the associated inturned flange,
   (d) the snap fastener including expandable means adapted to engage a supporting member upon insertion of the snap fastener into a compatible opening to fix the frame to the supporting member.
4. In a license plate holder:
   (a) a frame of substantially an E-shape cross section including a front flange, a rear flange and an intervening partition defining a pair of channels,
   (b) the frame being open at one side,
   (c) one channel being adapted to receive the license plate through the open side,
   (d) a puncture screw threadedly attached to the front flange and extending across the channel receiving the plate, the screw puncturing the plate to secure the plate to the frame, and
   (e) the other channel being adapted to receive a supporting member through the open side.
5. A license plate holder as defined in claim 4, in which:
   (f) the partition and the rear flange are provided with recesses through which the screw extends.
6. In a license plate holder:
   (a) a frame of substantially an E-shaped cross section including a front flange, a rear flange and an intervening partition defining a pair of channels, the frame being open at one side,
   (b) one channel being adapted to receive the license plate,
   (c) a puncture screw threadedly attached to the front flange and extending across the channel receiving the plate, the screw puncturing the plate to secure the plate to the frame,
   (d) the rear flange at opposite sides of the frame being provided with a recess, and
   (e) separable fastening means slidably inserted into the other said channel and into each recess, the fastening means being retained by the rear flange, the fastening means being adapted to secure the frame to a supporting member.
7. A license plate holder as defined in claim 6, in which:
   (f) the fastening means includes a hook received in one recess at one side of the frame, and a snap fastener received in the recess at the opposite side of the frame, the hook and snap fastener being adapted to interfit openings provided in the supporting member to secure the frame to the supporting member.
8. A license plate holder as defined in claim 6, in which:
   (f) the fastening means includes a snap fastener received in the recess at each side of the frame, each snap fastener having an expandable means engageable behind the supporting member upon insertion of the snap fasteners through compatible openings formed in the supporting member so as to secure the frame to the supporting member.
9. A license plate holder comprising:
   (a) a frame adapted to receive a plate,
   (b) a bar extending between opposite sides of and attached to the frame, and
   (c) fastening means slidably mounted to the bar for adjustment selectively to different positions, the fastening means being adapted to fix the frame to a supporting member.
10. A license plate holder comprising:
    (a) a frame adapted to receive a plate,
    (b) a bar extending between opposite sides of and attached to the frame, the bar including a slide track,
    (c) a plurality of snap fasteners slidably mounted on the track for adjustment selectively to different positions, each snap fastener being adapted to interfit an opening in a supporting member, and
    (d) each snap fastener having expandable means engageable behind the supporting member to fix the frame to the supporting member.
11. A license plate holder comprising:
    (a) a frame adapted to receive a plate, the frame including inturned flanges at opposite sides behind the plate,
    (b) a bar extending between the opposite sides of and attached to the inturned flanges, the bar including a slide track,
    (c) a plurality of snap fasteners slidably mounted on the track for adjustment selectively to different positions, each snap fastener being adapted to interfit an opening in a supporting member, and
    (d) each snap fastener having expandable means engageable behind the supporting member to fix the frame to the supporting member upon insertion of the snap fastener.
12. In a license plate holder:
    (a) a frame of substantially an E-shaped cross section defining a pair of channels, the frame being open at one side,
    (b) one channel being adapted to receive the license plate, and
    (c) a bar inserted into the other channel, the bar extending between opposite sides of and attached to the frame, and
    (d) fastening means slidably mounted to the bar for adjustment selectively to different positions, the fastening means being adapted to fix the frame to a supporting member.

13. A license plate holder as defined in claim 12, in which:
(e) the bar includes a slide track, and
(f) the fastening means includes a plurality of snap fasteners slidably mounted on the track for adjustment selectively to different positions, each snap fastener being adapted to interfit an opening in a supporting member, and
(g) each snap fastener having expandable means engageable behind the supporting member to fix the frame to the supporting member.

References Cited
UNITED STATES PATENTS

| | | | |
|---|---|---|---|
| 1,655,993 | 1/1928 | Frasier | 40—204 |
| 1,859,511 | 5/1932 | Herzogenrath et al. | 40—156 |

FOREIGN PATENTS

| | | |
|---|---|---|
| 38,770 | 5/1878 | Denmark. |

LAWRENCE CHARLES, *Primary Examiner.*